United States Patent
Segawa et al.

(10) Patent No.: US 7,334,848 B2
(45) Date of Patent: Feb. 26, 2008

(54) HYDRAULIC PRESSURE CONTROLLER

(75) Inventors: Taro Segawa, Kariya (JP); Takayuki Shibata, Nagoya (JP); Masuhiro Kondo, Ohbu (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/941,093

(22) Filed: Sep. 15, 2004

(65) Prior Publication Data

US 2005/0057093 A1    Mar. 17, 2005

(30) Foreign Application Priority Data

Sep. 17, 2003    (JP)    ............................. 2003-325015

(51) Int. Cl.
    *B60T 8/36*    (2006.01)
(52) U.S. Cl. ............................ 303/119.3; 303/DIG. 10; 137/884; 251/129.15
(58) Field of Classification Search ............ 303/119.1, 303/119.2, DIG. 10, 119.3, 116.4; 137/884; 251/129.15; 439/722
    See application file for complete search history.

(56) References Cited

U.S. PATENT DOCUMENTS

| | | | |
|---|---|---|---|
| 3,823,537 A * | 7/1974 | Uraya et al. ................... | 57/274 |
| 5,127,440 A | 7/1992 | Maas et al. | |
| 5,141,298 A * | 8/1992 | Von Hayn et al. ........ | 303/119.3 |
| 5,152,322 A | 10/1992 | Maas et al. | |
| 5,520,546 A * | 5/1996 | Klinger et al. ............... | 439/140 |
| 5,695,259 A * | 12/1997 | Isshiki et al. ............. | 303/119.2 |
| 5,845,672 A * | 12/1998 | Reuter et al. ........... | 137/315.03 |
| 5,941,282 A | 8/1999 | Suzuki et al. | |
| 6,059,382 A | 5/2000 | Schoettl | |
| 6,443,536 B1 * | 9/2002 | Tracht et al. ............. | 303/119.3 |
| 6,550,873 B1 * | 4/2003 | Hengler et al. ........... | 303/119.3 |
| 6,634,723 B1 | 10/2003 | Ganzel et al. | |
| 6,662,825 B2 * | 12/2003 | Frank et al. ................. | 137/557 |

FOREIGN PATENT DOCUMENTS

DE    37 42 320 A1    6/1989

(Continued)

OTHER PUBLICATIONS

Official Action issued by the German Patent Office in corresponding German Patent Application No. 10 2004 044 730.6-21, May 4, 2007; and English translation thereof.

*Primary Examiner*—Melody M. Burch
(74) *Attorney, Agent, or Firm*—Buchanan Ingersoll & Rooney PC

(57) ABSTRACT

A hydraulic pressure controller is provided which includes a hydraulic unit for controlling hydraulic pressure and an electronic control unit. The hydraulic unit includes a block in which are mounted electric actuators. The electronic control unit controls the electric actuators by applying electric signals thereto to control hydraulic pressure produced in the hydraulic unit to external elements in a controlled manner, thereby controlling the behavior of the vehicle. The electronic control unit includes a housing in which are mounted a circuit board and other electronic and electric parts, and a fitting portion provided on the housing so as to face one side of the block. At least one end portion of the block is received in the fitting portion and is engaged by a seal. The controller further includes a fastener for joining the block to the fitting portion.

1 Claim, 8 Drawing Sheets

FOREIGN PATENT DOCUMENTS

| | | |
|---|---|---|
| DE | 197 47 142 A1 | 5/1998 |
| DE | 199 10 938 A1 | 9/2000 |
| DE | 100 85 047 T1 | 11/2000 |
| EP | 0 856 447 A2 | 8/1998 |
| JP | 2-502900 | 9/1990 |
| JP | 2000-159081 | 6/2000 |
| JP | 2000-255415 | 9/2000 |
| JP | 2002-539017 | 11/2002 |
| WO | 00/53475 | 9/2000 |

* cited by examiner

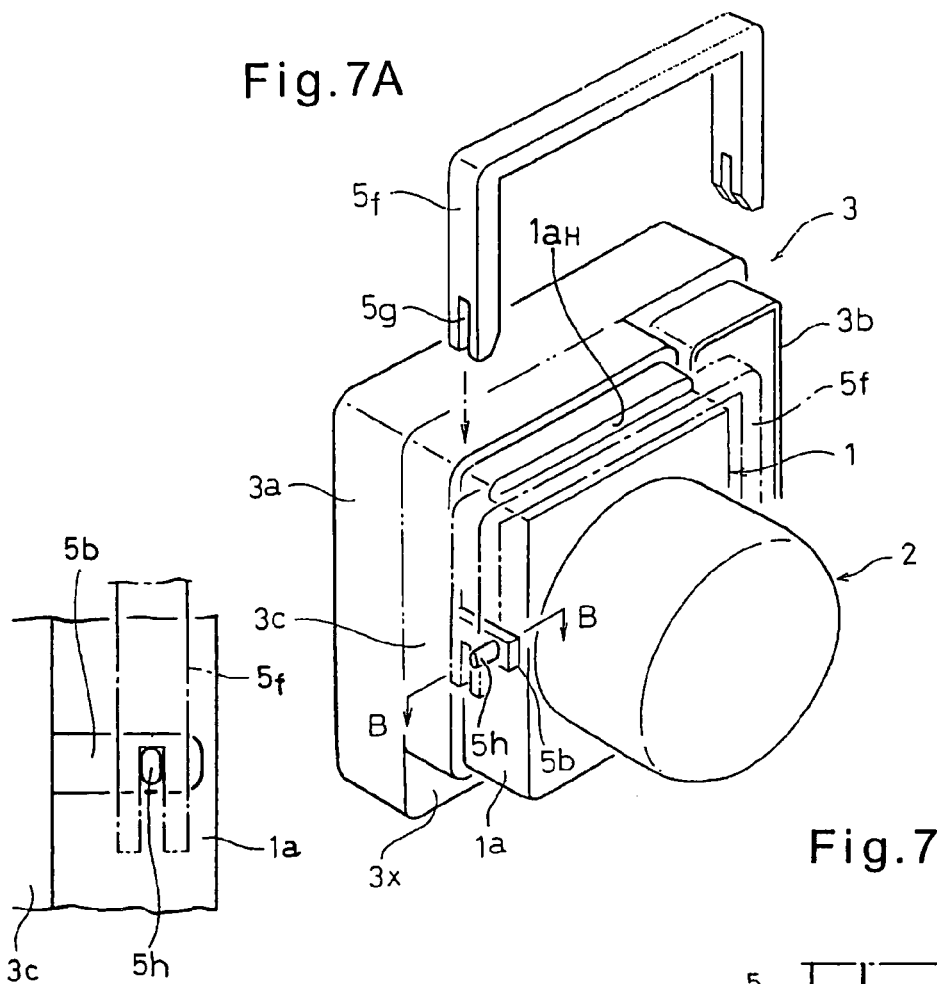
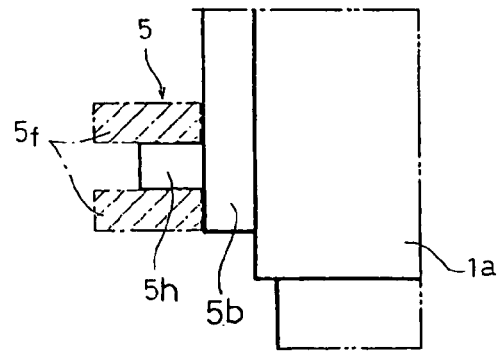
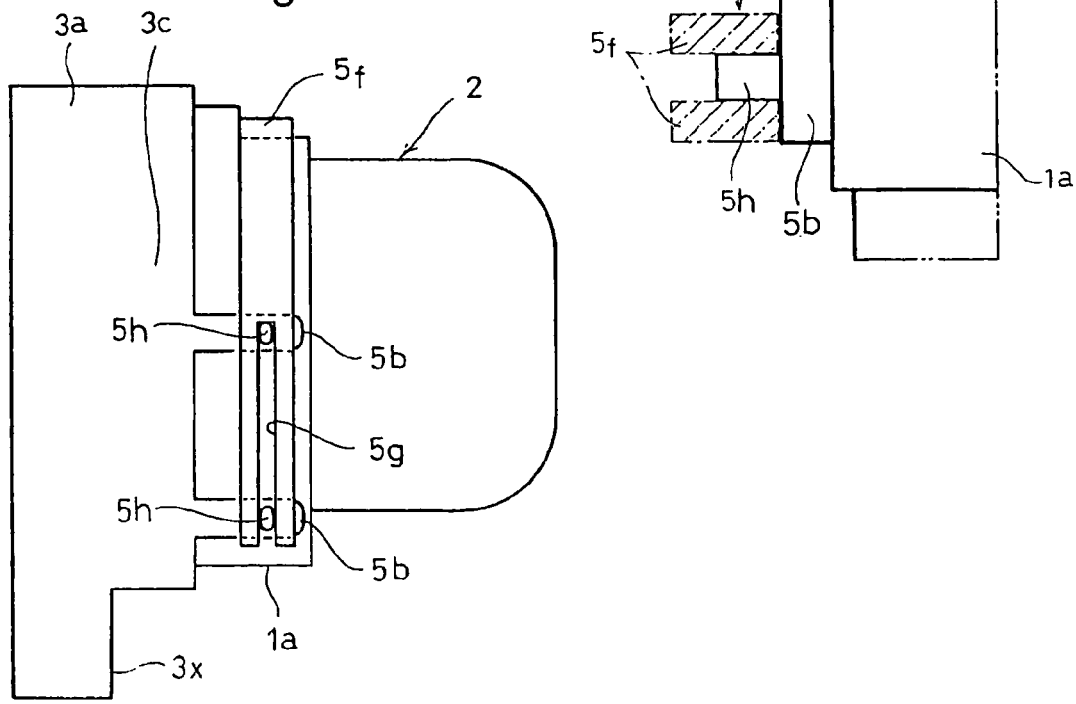
Fig. 7A
Fig. 7B
Fig. 7C

HYDRAULIC PRESSURE CONTROLLER

BACKGROUND OF THE INVENTION

This invention relates to a compact hydraulic pressure controller for use in e.g. a vehicle brake system, comprising a hydraulic unit and an electronic control unit joined to the hydraulic unit for controlling the hydraulic unit.

Modern motor vehicles are equipped with various hi-tech devices such as an anti-lock brake system (ABS), which obviates imminent lock-up of any vehicle wheel, thereby achieving optimum and efficient braking, a vehicle stability control (VSC) system, which controls brake pressures in individual wheel cylinders to keep a stable state of the vehicle, and a traction control (TRC) system. These devices have an electronic control unit (ECU) for controlling the entire system to adjust hydraulic pressures to the individual wheel cylinders.

The hydraulic unit, which includes solenoid valves and an actuator such as a pump unit, the motor, and the ECU are usually joined together to form a hydraulic pressure controller module because such a module is compact and low in manufacturing cost. In joining the electronic control unit to the block of the hydraulic unit, it was necessary to determine the size of the block of the hydraulic unit according to the size of the housing of the electronic control unit or vice versa.

Such a module is disclosed in unexamined JP patent publication 2000-255415 (Publication 1). This hydraulic pressure controller module has mounting protrusions provided outside of the perimeter of the housing of the electronic control unit. Joint members such as threaded bolts are passed through the mounting protrusions and the block of the hydraulic unit to join the block to the housing. The hydraulic pressure controller module disclosed in this publication further includes a motor joined to the hydraulic unit. It is an element of a vehicle brake hydraulic pressure control system.

In the arrangement of this publication, because the mounting protrusions are provided outside of the perimeter of the housing, it is necessary that the block of the hydraulic unit have a greater cross-section than the housing of the electronic control unit. This leads to increased volume (size) of the block, and thus increased cost and weight of the block.

JP patent publication 2-502900 (Publication 2) discloses a similar device, though its ECU is not joined to the block of the hydraulic unit. But this publication proposes to provide a cover that is fixed to the block of the hydraulic unit to protect portions of electric parts of solenoid valves provided on the block of the hydraulic unit that protrude from the block. The cover is formed of such a material that electric lines can be provided therein. Also, power supply means is mounted in the cover. The hydraulic unit includes only flow passages and the solenoid valves, that is, it does not include hydraulic pumps.

In one embodiment of this publication, a downwardly extending skirt is formed on the bottom end of the block of the hydraulic unit, and the skirt is fitted in the block of the hydraulic unit to mount the cover to the block. In another embodiment of this publication, claws are formed on the skirt of the block of the hydraulic unit, and the claws are engaged in grooves formed in the block to join the cover to the block body.

Unexamined JP patent publication 2002-539017 (Publication 3) also discloses a similar structure. In this publication, a substantially U-shaped claw is formed on the skirt of the cover, and the claw is engaged in a groove formed in the block, thereby elastically binding the block from outside. This ensures sealability of a seal member (O-ring) provided between the claw and the top end of the block.

As described above, Publication 1 discloses a hydraulic pressure controller module comprising a hydraulic unit and an ECU joined to the block of the hydraulic unit. As explained above, since the mounting protrusions are provided outside of the perimeter of the housing of the ECU, the size of the housing of the ECU is determined by the size of the block of the hydraulic unit, and vice versa. The block of the hydraulic unit is formed of an expensive material such as an aluminum alloy. Thus, it is desirable that such a block be as small in size (volume) as possible to reduce the material cost. On the other hand, in order to perform sophisticated control of the vehicle, it is necessary to use a circuit board that is sufficiently large in area. In order to accommodate such a large circuit board, a correspondingly large housing is needed. If such a large housing is used to accommodate a sufficiently large circuit board, it is necessary to use a correspondingly large hydraulic unit block. This pushes up the material cost. If a smaller hydraulic unit block is used, the size of the housing of the ECU has to be correspondingly reduced. Such a small housing may not be capable of accommodating a sufficiently large circuit board.

As mentioned above, Publication 2 teaches joining the cover, which is far lighter in weight than an electronic control unit, to the block of the hydraulic unit by means of the claws provided on the short skirt of the cover. It is apparent that such claws and skirt cannot reliably join a much heavier ECU to the block of a hydraulic unit. Of course, Publication 2 does not suggest using such a joint arrangement to connect an ECU to the block of a hydraulic unit. This is true for the joint arrangement disclosed in Publication 3, too.

In order for a seal member provided between the cover and the hydraulic unit to exhibit sufficient sealability, sufficiently large binding force is needed. It is apparent that such a large binding force is not obtainable only with claws formed on the resin cover as disclosed in Publication 3. Rather, due to stress concentration on the claws, creeping tends to occur. Creeping lowers sealability. Further, since such claws are provided discontinuously, no uniform binding force is obtainable. That is, at portions remote from the claws, binding force tends to be low, which lowers sealability.

An object of this invention is to provide a hydraulic pressure controller which comprises a hydraulic unit and an electronic control unit joined to the hydraulic unit and in which the dimensions of the housing of the electronic control unit and the dimensions of the block of the hydraulic unit can be determined freely independently of each other.

SUMMARY OF THE INVENTION

According to this invention, there is provided a hydraulic pressure controller mounted on a vehicle and comprising a hydraulic unit for controlling hydraulic pressure, the hydraulic unit including a block in which are mounted electric actuators, an electronic control unit for controlling the electric actuators by applying electric signals thereto to control the hydraulic pressure produced in the hydraulic unit to external elements in a controlled manner, thereby controlling the behavior of the vehicle, the electronic control unit including a housing in which are mounted a circuit board and other electronic and electric parts, and a fitting portion provided on the housing, the block having at least one end portion thereof received in the fitting portion with the fitting portion opposed to a side surface of the block, and a fastener for joining the block to the fitting portion.

With this arrangement, the dimensions of the block of the hydraulic unit are determined by the dimensions of the fitting portion. But the dimensions of the fitting portion can be determined independently of the dimensions of the housing of the electronic control unit. Thus, the dimensions of the housing and the dimensions of the block can be determined independently of each other. Thus, the dimensions of the circuit board in the housing can also be determined independently of the dimensions of the block of the hydraulic unit.

Preferably, a seal member is disposed between the fitting portion and the side surface of the block for sealing any gap present between the fitting portion and the block. The fitting portion is preferably detachably joined to the block of the hydraulic unit through the fastener so that maintenance work of the ECU and the solenoid valves in the hydraulic unit can be carried out more easily.

BRIEF DESCRIPTION OF THE DRAWINGS

Other features and objects of the present invention will become apparent from the following description made with reference to the accompanying drawings, in which:

FIG. 7A is a perspective view of a further embodiment, showing its fastener;

FIG. 7B is an enlarged sectional view taken along line B-B of FIG. 7A;

FIG. 7C is a side view of a modified embodiment, in which two threaded bolts are prevented from being pulled out;

DETAILED DESCRIPTION OF THE PREFERRED EMBODIMENT

Figure 1A:
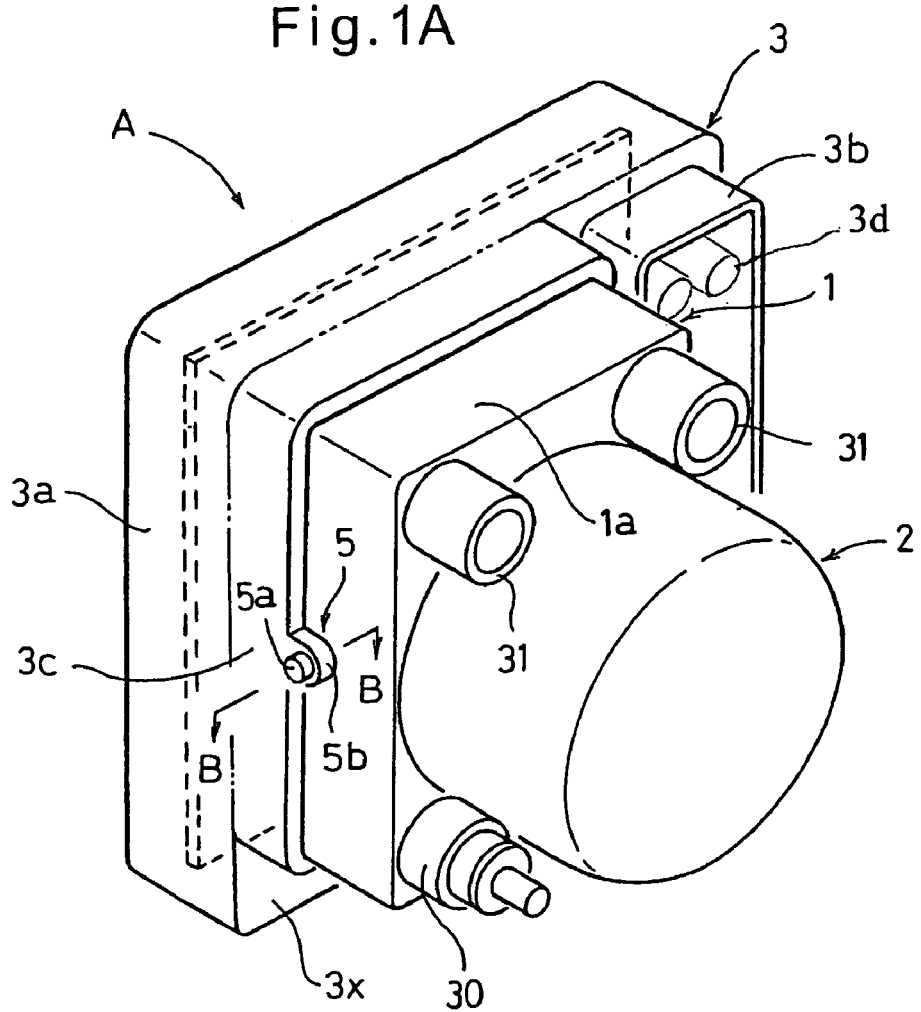
FIG. 1A is a perspective view of a hydraulic pressure controller embodying the present invention.
Figure 1B:
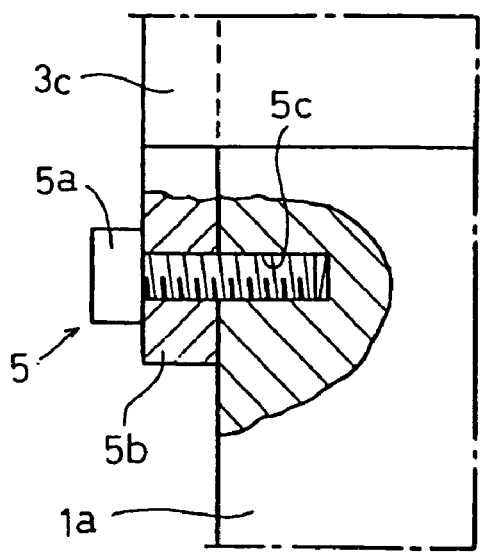
FIG. 1B is an enlarged sectional view of the hydraulic pressure controller of the same, taken along line B-B of FIG. 1A.
Figure 1C:
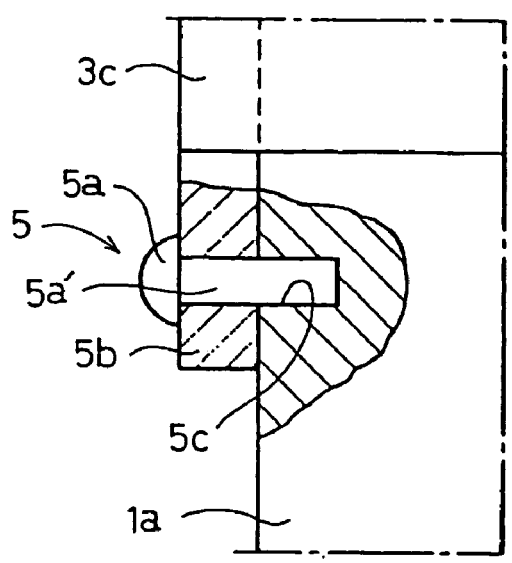
FIG. 1C is a view similar to FIG. 1B showing a different fastener.
Figure 2:
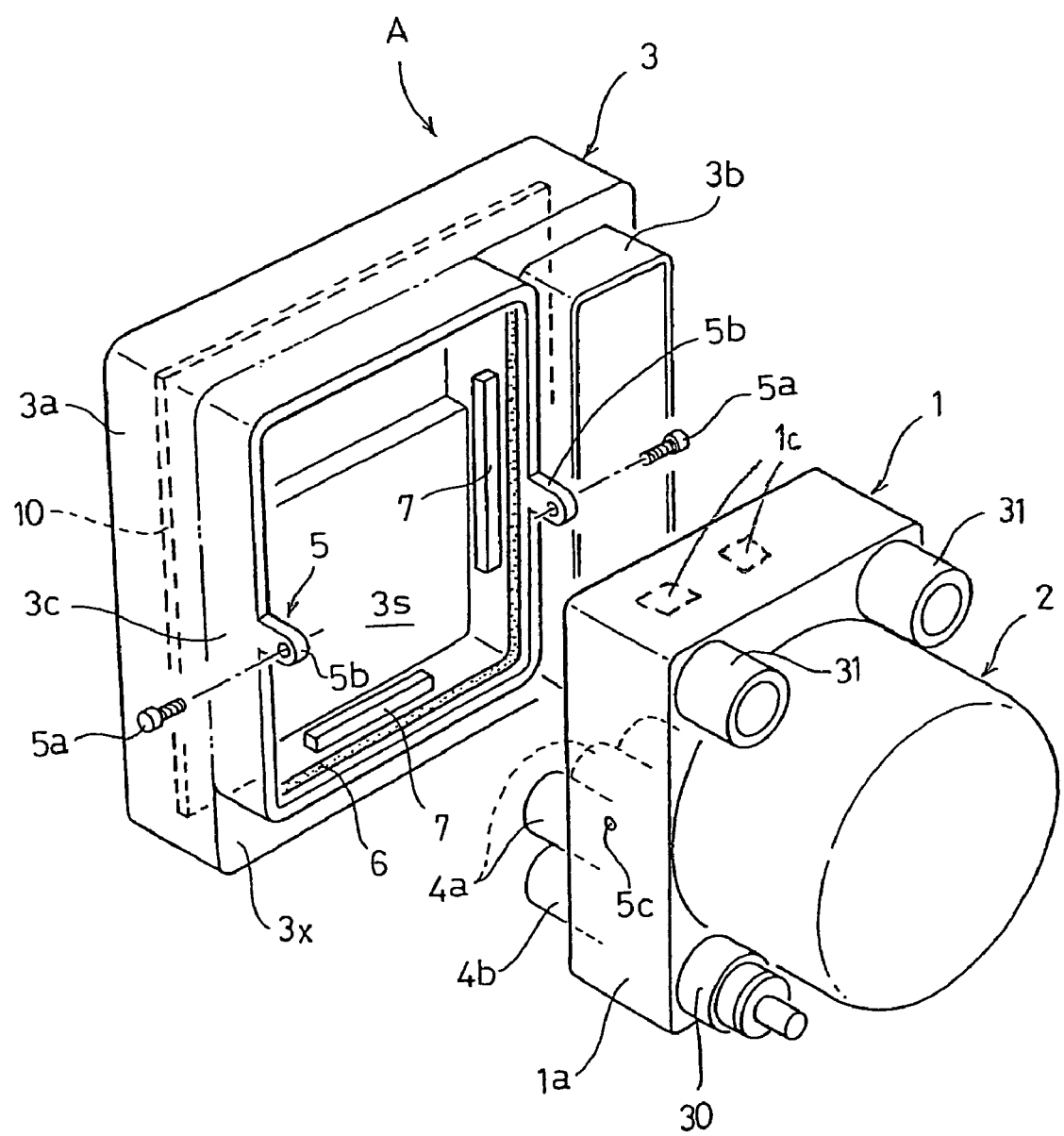
FIG. 2 is an exploded perspective view of the same.

Now referring to FIGS. 1 and 2, the hydraulic pressure controller A of this embodiment comprises a hydraulic unit 1 including hydraulic pumps, solenoid valves 4a and 4b (FIGS. 2 and 3) and a reservoir, an electric motor 2 for driving the hydraulic pumps, and an electronic control unit 3 for controlling and driving the solenoid valves, the motor and other electric actuators (schematically shown as 1c in FIG. 2). The electronic control unit 3 has its housing 3a joined to a block 1a of the hydraulic unit 1. The hydraulic pressure controller A shown is an element of an anti-lock brake system (ABS).

The block 1a is a relatively thick, substantially box-shaped member made of an aluminum alloy and formed with a cavity in which are received the hydraulic pumps (not shown). The pumps, the solenoid valves 4a and 4b, and other elements of the controller A are connected together through flow passages formed in the block 1a. A conventional such block 1a has a size or volume that is slightly greater than that of the housing 3a or substantially equal to that of the portion of the housing 3a not including its electric connector portion. The block 1a embodying the invention is connected not directly to the housing 3a but to a fitting portion 3c provided on the housing 3a. The size (or sectional area, to be more precise) of the block 1a is thus determined by the size of the fitting portion 3c and not by the size of the housing 3a. Thus, the block 1a can be made smaller in size (sectional area) than the housing 3a.

The electric motor 2 is an ordinary one including an armature (rotor), a permanent magnet and a brush that are housed in a casing. But the detailed internal structure is not the point of the invention and thus not shown here. The housing 3a shown is a box-shaped, hermetically sealed plastic member. But the housing 3a according to the present invention does not necessarily have to be hermetically sealed. The housing 3a carries a connector case 3b containing electric connectors 3d to which electric cords are to be connected.

Figure 3A:
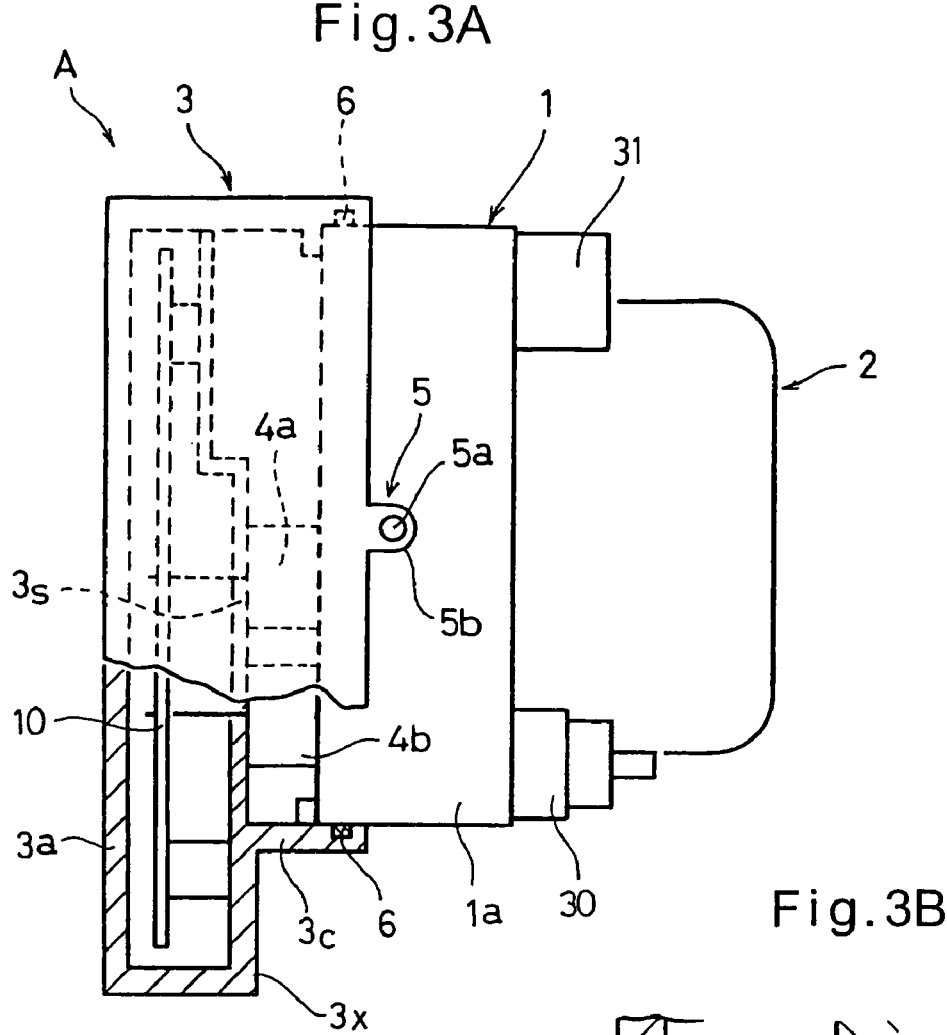
FIG. 3A is a partially cutaway side view of the same.

The housing 3a has its side facing the block 1 closed by a partitioning wall 3s to hermetically seal the interior of the housing 3a. As shown in FIG. 3A, a circuit board 10 is mounted in the hermetically sealed interior of the housing 3a. The circuit board 10 carries on one side thereof a microcomputer, an FET transistor driver circuit, and other electronic parts. An anti-lock control program is stored in the microcomputer.

On the inner surface of the partitioning wall 3s, too, bus bars and other electronic parts are mounted. The partitioning wall 3s is mounted to the housing 3a through a seal member not shown. The fitting portion 3c is a skirt member provided on the side of the housing 3a facing the block 1a. The fitting portion 3c comprises relatively thick four side walls and is sized such that the block 1a can be inserted in the fitting portion 3c with the four sides of the block 1a in close contact with the respective inner surfaces of the four side walls of the fitting portion 3c. The fitting portion 3c is formed of the same material as the housing 3a and is integral with the housing 3a.

The solenoid valves 4a and 4b are provided in a plurality of pairs in upper and lower tiers, respectively, on the back wall of the block 1a. The upper solenoid valves 4a are pressure increase valves while the lower ones 4b are pressure reduction valves. They are both two-position changeover valves and similar in structure but not exactly the same due to their difference in function. Ports (not shown) are formed in the top surface of the block 1a to which pipes are connected through which hydraulic pressure is supplied. Ports 31 are connected to a master cylinder (not shown) through pipes. The controller A further includes mounts 30 to be supported on a support frame of a vehicle body.

Since the block 1a is joined to the fitting portion 3c, the dimensions of the housing 3a and the block 1a can be determined independently of each other. Thus, as shown in FIG. 3A, it is possible to provide the housing 3a with an extension 3x protruding downwardly from the bottom end of the block 1a. The length and thus the area of the extension 3x can be freely determined independently of the dimensions of the block 1a. The length and area of the circuit board 10 mounted in the housing 3a can be increased by increasing the length and area of the extension 3x.

Figure 3B:
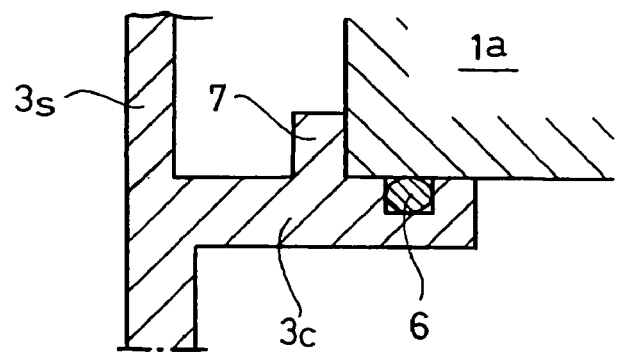
FIG. 3B is an enlarged sectional view of the same, showing its sealed portion.
Figure 3C:
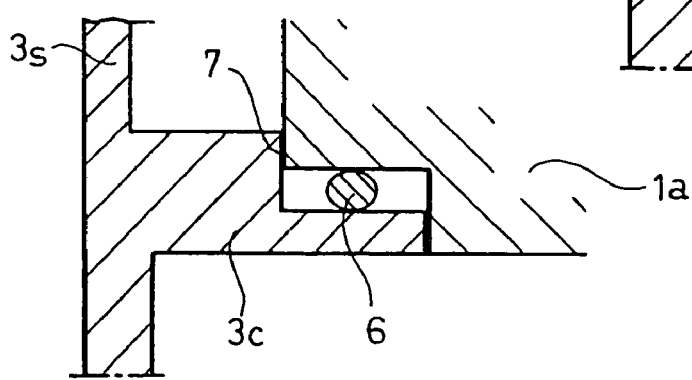
FIG. 3C is a view similar to FIG. 3B, showing a different sealed portion.

To join the block 1a to the housing 3a, the block 1a is inserted into the fitting portion 3c in a first direction D1 (see FIG. 3A) until its end abuts ledges 7 as shown in FIGS. 3A-3C, and the block 1a is secured to the fitting portion 3c through a pair of fasteners 5 provided on opposite sides of the block 1a. As shown in FIG. 2, a seal member 6 may be provided on the inner surface of the fitting portion 3c between the ledges 7 and the edge of the fitting portion 3c to bear against the side surface of the block 1a in a second direction D2 transversely of the first direction D1 (see FIG. 3A), and seal the gap between the block 1a and the inner surface of the fitting portion 3c. But the seal member 6 is not an essential element. FIG. 1B shows a specific fastener 5, which comprises a tongue 5b formed on the edge of the fitting portion 3c and having a bolt hole, and a threaded bolt 5a inserted through the bolt hole of the tongue 5b into a threaded bolt hole formed in the corresponding side of the block 1a.

With this arrangement, the dimensions of the block 1a are determined by the dimensions of the fitting portion 3c, which can be determined independently of the dimensions of the housing 3a. Thus, the dimensions of the block 1a and the housing 3a can be determined independently of each other. The dimensions of the block 1a can be determined at desired (i.e. minimum) values independently of the dimensions of the housing 3a. The dimensions of the housing 3a, and thus the dimensions of the circuit board 10 in the housing 3a can also be freely determined at any desired values independently of the dimensions of the block 1a. As is especially evident from FIG. 2, the fitting space defined by the fitting portion 3c has a surface area that is substantially smaller than the side surface of the housing 3a on which the fitting portion 3c is formed, as viewed in the direction D1 which is perpendicular to those surface areas.

The tongues 5b are made of the same plastic material as the fitting portion 3c and thus the housing 3a, and are integral with the fitting portion 3c. In the embodiment shown, the pair of fasteners 5 are provided on the opposed vertical side edges of the fitting portion 3c. FIG. 1C shows another specific fastener 5, which comprises a tongue similar to the tongue 5b of FIG. 1B and a rivet 5a' which is passed through the hole in the tongue 5b and pressed into a non-threaded hole 5c formed in the block 1a. Instead of or in addition to these fasteners 5, a pair of similar fasteners 5 may be provided on the top and bottom horizontal edges of the fitting portion 3c. The seal member 6 is a ring that extends the entire inner surfaces of all the four side walls of the joint portion 3c. The seal member shown is an O-ring but may be any other seal member which can liquid-tightly seal the gap between the block 1a and the inner surface of the fitting portion 3c, such as a corrugated ring (labyrinth packing). Instead of the ledges 7, a shoulder 7 may be formed on the inner surface of the fitting portion 3c as shown in FIG. 3C.

Figure 4A:
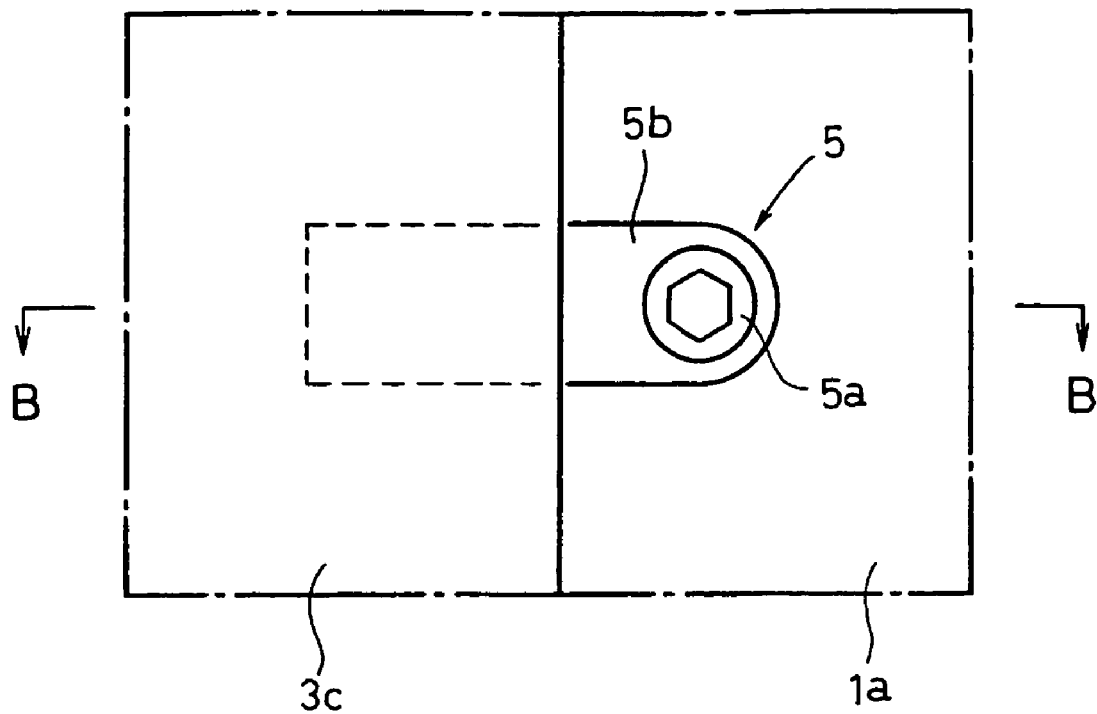
FIG. 4A is a side view of a portion of a different embodiment, showing its fastener.
Figure 4B:
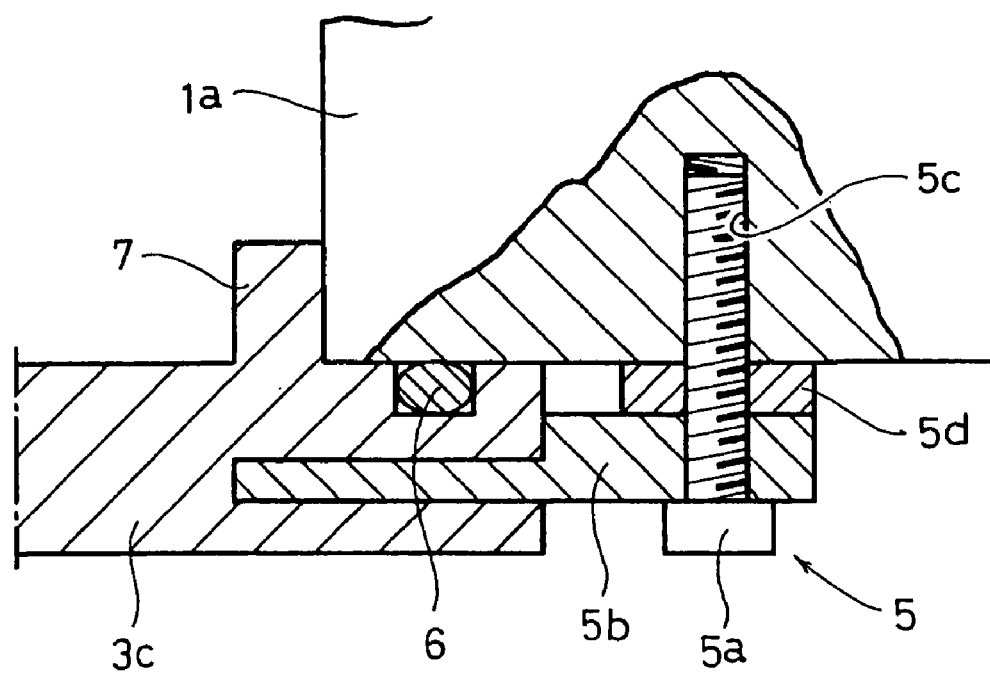
FIG. 4B is an enlarged sectional view taken along line B-B of FIG. 4A.

FIGS. 4-10 show different fasteners. In any of the embodiments of FIGS. 4-10, unless otherwise stated, structural elements other than the fasteners are identical to those of the first embodiment. In the embodiment of FIG. 4, the tongue 5b of each fastener 5 is made of a metal for added strength and embedded in the corresponding side wall of the fitting portion 3c when the fitting portion 3c is formed by molding a plastic material. Otherwise, the metallic tongue 5b of each fastener 5 may be received in a recess formed in the outer surface of the corresponding side wall of the fitting portion 3c and secured thereto when molding the fitting portion 3c. It may also be secured to the fitting portion 3c in any other way.

Figure 5:
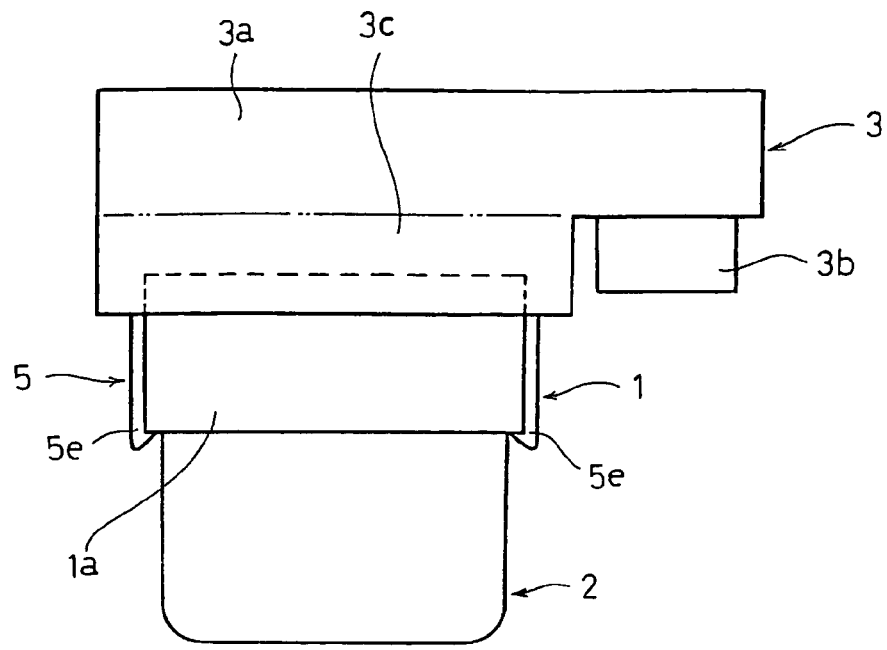
FIG. 5 is a plan view of still another embodiment, showing its fastener.

In the embodiment of FIG. 5, a pair of fasteners 5 extend from the edge of the fitting portion 3c. The fasteners 5 have hooks 5e extending toward each other at their free ends. The fasteners 5 have such a length that the hooks 5e can engage the end face of the block 1a remote from the fitting portion 3c by elastically deforming the hooks 5e as shown.

Figure 6:
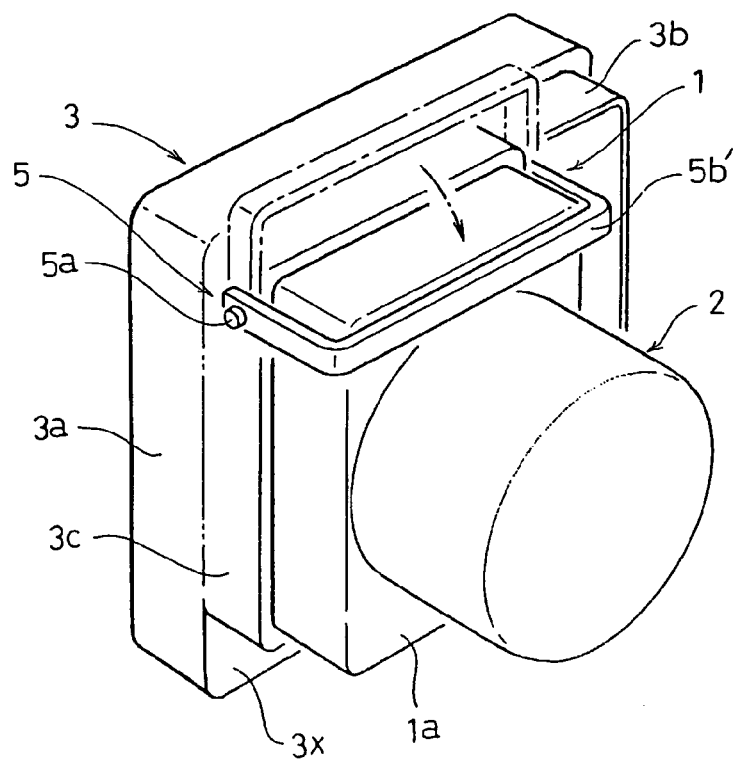
FIG. 6 is a perspective view of yet another embodiment, showing its fastener.

In the embodiment of FIG. 6, a single fastener 5 is used which comprises a substantially U-shaped lever 5b' having the free ends of its legs pivotally supported on threaded bolts 5a engaged in the opposed side walls of the fitting portion 3c. By pivoting the lever 5b' from the position shown by phantom line to the position shown by solid line, the crossbar portion of the U-shaped lever 5b' engages the surface of the block 1a remote from the fitting portion 3c, thereby joining the block 1a to the fitting portion 3c. Instead of the single U-shaped lever 5b', a pair of L-shaped levers, which are practically two split portions of the U-shaped lever 5b', may be used. Thus, the L-shaped levers are pivotally supported on the respective bolts 5a so that their short arms can engage the surface of the block 1a remote from the fitting portion 3c, thereby joining the block 1a to the fitting portion 3c. While not shown in FIG. 6, the controller of this embodiment has the mounts 30 and the ports 31.

In the embodiment of FIGS. 7A and 7B, a single fastener 5 is used which comprises a pair of tongues 5b provided on the edges of opposed walls of the joint portion 3c and each formed with a protrusion 5h, and a lever member 5f. The lever member 5f is a substantially U-shaped member formed with a cutout 5g at each free end thereof. The block 1a of the hydraulic unit 1 is formed with a step portion 1aH. The lever member 5f is dimensioned such that with the block 1a received in the fitting portion 3c and the crossbar portion of the lever member 5f engaging the step portion 1aH, the protrusions 5h of the tongues 5b engage in the respective cutouts 5g of the lever member 5f, thereby joining the block 1a to the fitting portion 3c. In order to prevent the lever member 5f from rattling, the protrusions 5h of the tongues 5b have preferably an oval, polygonal or any other non-circular cross-sectional shape. For the same purpose, instead of providing a single protrusion 5h for each cutout 5g as shown in FIG. 7A, a plurality of protrusions 5h may be provided so as to be engaged in each of elongated cutouts 5g formed in the ends of the lever member 5f as shown in FIG. 7C.

In the embodiments of FIGS. 5-7, by bringing the portions 5e, 5b' and 5f of the fastener 5 into engagement with a surface of the block 1a remote from the fitting portion 3c, the block 1a is joined to the fitting portion 3c. Thus, the fastener 5 of any of these embodiments needs no bolts, pins or screws. Thus, it is not necessary to form bolt holes, pin holes or screw holes in the block 1a of the hydraulic unit 1. This reduces the number of manufacturing steps. In this regard, the hooks 5e of the embodiment of FIG. 5 are especially preferable because they can be formed as integral parts of the fitting portion 3c.

Figure 8:
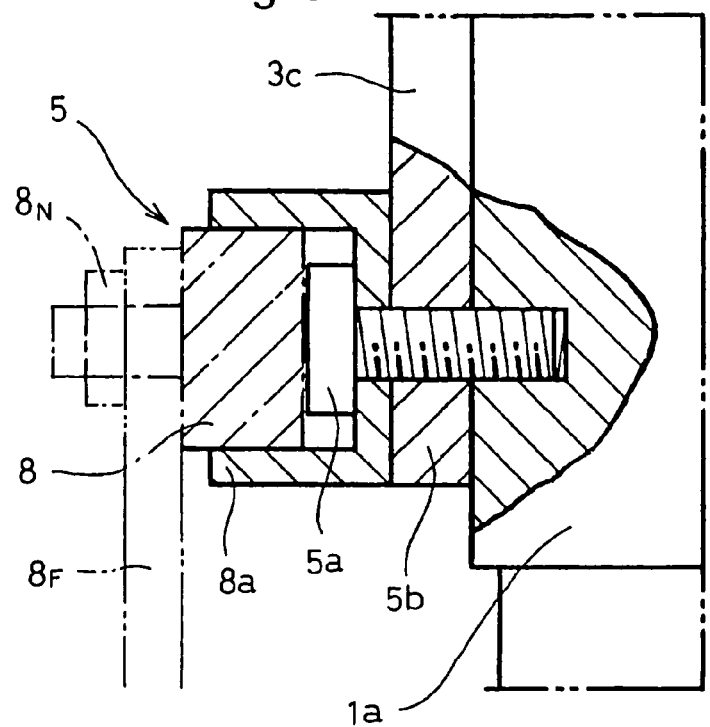
FIG. 8 is an enlarged sectional view of another embodiment, showing its fastener.

In the embodiment of FIG. 8, fasteners 5 similar to those of the embodiment of FIGS. 1-3 are used. That is, they each comprise a threaded bolt 5a and a tongue 5b. In this embodiment, the bolt 5a of each joint member 5 is in threaded engagement with the tongue 5b with a mount cover 8a sandwiched between the head of the bolt 5a and the tongue 5b. The mount cover 8a has a flange portion defining a recess in which is fitted a mount member 8 (rubber mount). The mount member 8 carries a bolt on which a support frame 8F can be mounted by a nut 8N. Since the mount member 8 is used as a substitute for the mount member 30 of the embodiment of FIGS. 1-3 (see FIG. 1A), the latter is omitted in this embodiment.

Figure 9:
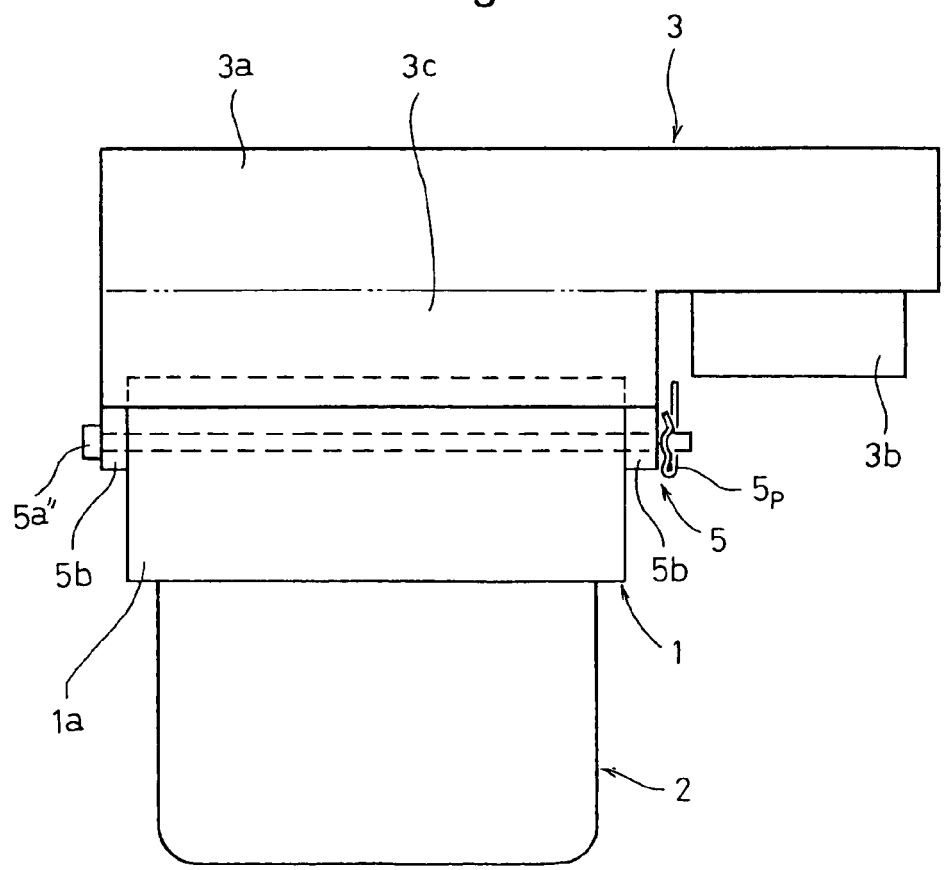
FIG. 9 is a plan view of still another embodiment, showing its fastener.

In the embodiment of FIG. 9, a single fastener 5 is used which comprises tongues 5b provided on opposed walls of the joint portion 3c, a bolt 5a'' and a pin 5p. The bolt 5a'' extends through one of the tongues 5b, the block 1a and the other of the tongues 5b so that its tip protrudes from the other tongue 5a with its head in abutment with said one of the tongues 5b. The pin 5p is engaged in a pin hole formed in the bolt 5a'' at its portion protruding from the other tongue 5b to prevent the bolt 5a'' from getting off.

Figure 10:
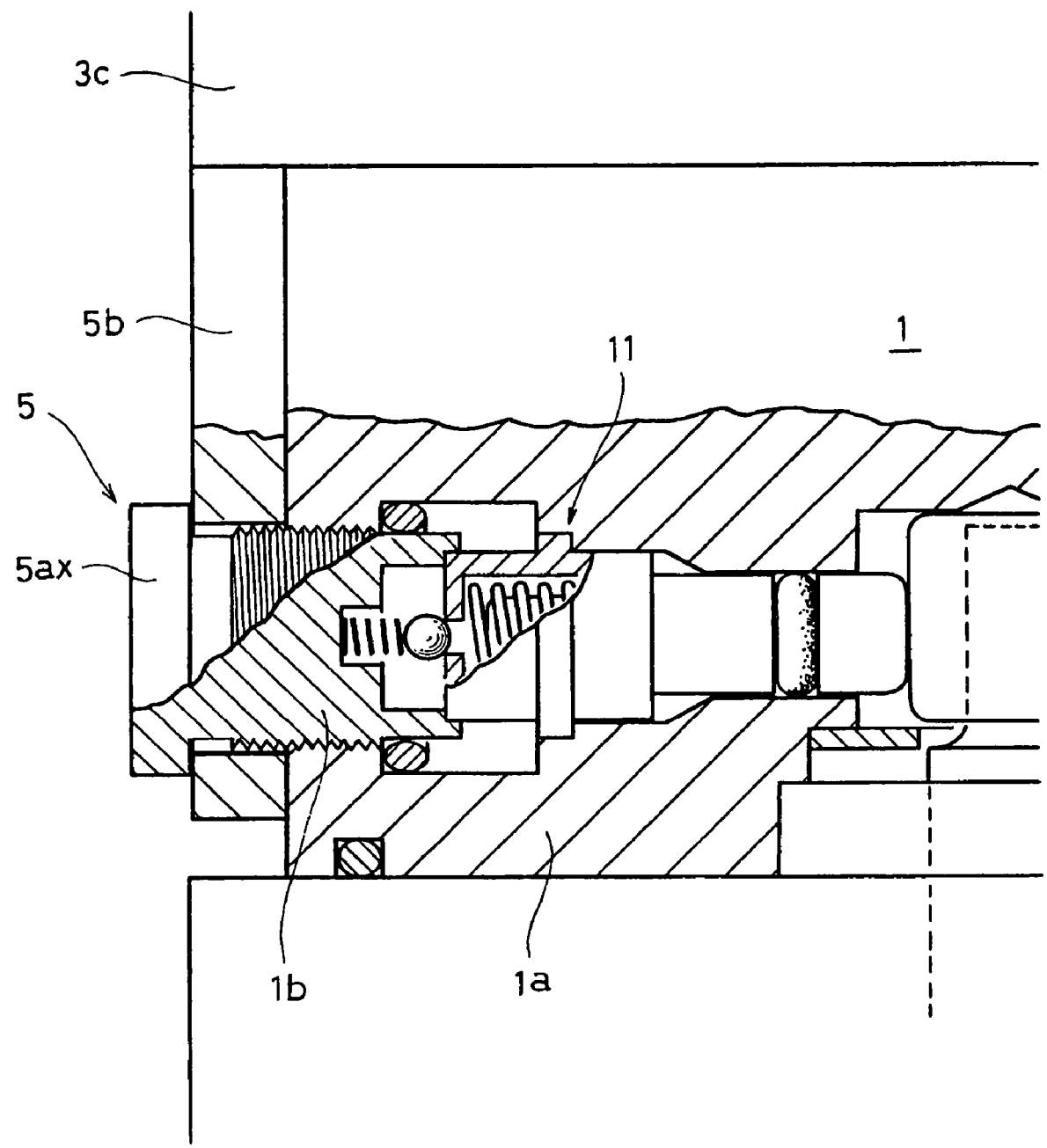
FIG. 10 is an enlarged sectional view of a further embodiment, showing its fastener.

In the embodiment of FIG. 10, a pair of fasteners 5 are used, each comprising a pump plug 1b of one of a pair of hydraulic pumps 11 which are received in the block 1a of the hydraulic unit 1, and a tongue 5b provided on one of opposed walls of the fitting portion 3c. A conventional hydraulic unit of this type needs a pump plug to seal the recess in which is mounted the hydraulic pump 11 by press-fitting, threaded engagement or caulking. The pump plug 1b as a part of each fastener 5 of this embodiment differs from such a conventional pump plug in that it has a head 5ax adapted to engage one of the tongues 5b when the plug 1b is fully inserted into the block 1a. Each tongue 5b is formed with a hole through which the shank of the plug 1b can pass. Thus, by inserting the shank of each pump plug 1b through the hole of the tongue 5b into the block 1a until the head 5ax of the plug 1b engages the tongue 5b, the block 1a is secured to the fitting portion 3c and simultaneously, the recess in the block 1a in which is received each hydraulic pump 11 is sealed by the plug 1b.

In the embodiments of FIGS. 8 and 10, because parts of other functional elements are used as at least a portion of the fastener, it is possible to reduce the number of parts of the entire hydraulic pressure controller. Also, it is not necessary to form additional threaded holes or pin holes only to join the housing 3a to the block 1a.

In the embodiment of FIGS. 1-3, the housing 3a and the circuit board 10 of the electronic control unit 3 protrudes downwardly from the block 1a as shown at 3x. But they may be dimensioned so as to protrude in any other direction or directions.

The hydraulic pressure controller according to the present invention can be used in various vehicle hydraulic brake systems for controlling the behavior of the vehicle by supplying controlled hydraulic pressure to wheel cylinders, such as ABS's, traction control systems and VSC systems.

What is claimed is:

1. A hydraulic pressure controller adapted to be mounted on a vehicle and comprising a hydraulic unit for controlling hydraulic pressure, said hydraulic unit including a block in which electric actuators are mounted in one end portion side thereof, the electric actuators being controllable by electric signals, an electronic control unit for supplying the electric signals to supply the hydraulic pressure produced in said hydraulic unit to external elements in a controlled manner, thereby controlling the behavior of the vehicle, said electronic control unit including a housing in which are mounted a circuit board, and a fitting portion provided on one surface of said housing, said block having at least said one end portion thereof received in said fitting portion with said fitting portion opposed to a side surface of said block, said fitting portion defining a fitting space in which said at least one end portion of said block is received in a first direction, said fitting space being substantially smaller in surface area than said one surface of said housing as viewed in the first direction perpendicular to said one surface of said housing, a fastener for joining said block to said fitting portion, and a seal member for said electric actuators disposed between said fitting portion and said side surface of said block and bearing against said side surface in a second direction transversely of the first direction, wherein a portion of said one surface extends beyond said fitting space in said second direction for forming a connector case portion of said housing which contains at least one electrical connector of the electric control unit, wherein said hydraulic unit further includes a hydraulic pump mounted in said block, and said fastener serves to join said block to said fitting portion and to fix said pump to said block.

* * * * *